(12) United States Patent
Chen et al.

(10) Patent No.: US 12,072,705 B2
(45) Date of Patent: Aug. 27, 2024

(54) INTELLIGENT DECISION-MAKING METHOD AND SYSTEM FOR UNMANNED SURFACE VEHICLE

(71) Applicant: CENTRAL CHINA OPTOELECTRONIC TECHNOLOGY RESEARCH INSTITUTE, Wuhan (CN)

(72) Inventors: Fusheng Chen, Wuhan (CN); Yue Leng, Wuhan (CN); Erbo Zou, Wuhan (CN); Bo Lei, Wuhan (CN); Longhe Yang, Wuhan (CN)

(73) Assignee: CENTRAL CHINA OPTOELECTRONIC TECHNOLOGY RESEARCH INSTITUTE, Wuhan (CN)

( * ) Notice: Subject to any disclaimer, the term of this patent is extended or adjusted under 35 U.S.C. 154(b) by 373 days.

(21) Appl. No.: 17/432,291

(22) PCT Filed: Oct. 14, 2020

(86) PCT No.: PCT/CN2020/120860
§ 371 (c)(1),
(2) Date: Aug. 19, 2021

(87) PCT Pub. No.: WO2021/073528
PCT Pub. Date: Apr. 22, 2021

(65) Prior Publication Data
US 2022/0197281 A1    Jun. 23, 2022

(30) Foreign Application Priority Data

Oct. 18, 2019  (CN) .......................... 201910993637.8

(51) Int. Cl.
*G05D 1/00* (2024.01)
*G05D 1/02* (2020.01)
(Continued)

(52) U.S. Cl.
CPC ......... *G05D 1/0088* (2013.01); *G05D 1/0094* (2013.01); *G05D 1/0206* (2013.01);
(Continued)

(58) Field of Classification Search
CPC . G06T 7/246; G06T 7/73; G06T 2207/10048; G06T 2207/20081;
(Continued)

(56) References Cited

U.S. PATENT DOCUMENTS

| 7,327,855 B1 * | 2/2008 | Chen ........................ G08G 1/04 |
| | | 382/104 |
| 10,528,809 B2 * | 1/2020 | Liu ....................... A61B 5/1171 |

(Continued)

FOREIGN PATENT DOCUMENTS

| CN | 108831161 A | 11/2018 |
| CN | 109117838 A | 1/2019 |

(Continued)

OTHER PUBLICATIONS

Changjian Lin et al. "An improved recurrent neural network for unmanned underwater vehicle online obstacle avoidance", Ocean Engineering, Sep. 5, 2019 (Sep. 5, 2019).

(Continued)

*Primary Examiner* — Tuan C To

(57) ABSTRACT

An intelligent decision-making method and system for an unmanned surface vehicle are provided. The system comprises: an image acquisition module, configured to acquire an image sequence signal of an observation region; a target detection and recognition module, configured to receive the image sequence signal, recognize a preset interested target appeared in a scenario, determine and identify an image region occupied by the preset interested target; distinguish a type of the interested target, screen out the target that causes a threat to an unmanned platform itself according to the type (Continued)

of the target, continuously observe the target, and generate tracking trajectory information of the target; a target situation distinguishing module, configured to calculate a target threat factor; and a target threat evaluation and decision module, configured to evaluate a threat type, give a threat level, and lock the interested target with a high threat level for tracking in real time.

10 Claims, 8 Drawing Sheets

(51) Int. Cl.
*G05D 1/12* (2006.01)
*G06N 3/08* (2023.01)
*G06N 3/084* (2023.01)
*G06T 7/246* (2017.01)
*G06T 7/73* (2017.01)

(52) U.S. Cl.
CPC ............... *G05D 1/12* (2013.01); *G06N 3/084* (2013.01); *G06T 7/246* (2017.01); *G06T 7/73* (2017.01); *G06T 2207/10048* (2013.01); *G06T 2207/20081* (2013.01); *G06T 2207/20084* (2013.01); *G06T 2207/30241* (2013.01); *G06T 2207/30252* (2013.01)

(58) Field of Classification Search
CPC . G06T 2207/20084; G06T 2207/30241; G06T 2207/30252; G05D 1/12
USPC .......................................................... 701/21
See application file for complete search history.

(56) References Cited

U.S. PATENT DOCUMENTS

| | | | |
|---|---|---|---|
| 10,733,465 B2* | 8/2020 | Wang | G06F 18/24143 |
| 11,055,872 B1* | 7/2021 | Chen | G06V 10/764 |
| 11,181,634 B1* | 11/2021 | Lue | G06N 3/045 |
| 11,468,285 B1* | 10/2022 | Tang | B60W 60/0027 |
| 2010/0013917 A1* | 1/2010 | Hanna | G08B 13/19689 348/E13.001 |
| 2014/0029852 A1* | 1/2014 | Pisipati | G06T 7/13 382/199 |
| 2016/0335504 A1* | 11/2016 | Midavaine | G06V 20/00 |
| 2018/0365835 A1* | 12/2018 | Yan | G06V 10/764 |
| 2019/0065859 A1* | 2/2019 | Togashi | G06T 7/215 |
| 2019/0146590 A1 | 5/2019 | Chiang et al. | |
| 2019/0258866 A1* | 8/2019 | Khadloya | G08B 13/19695 |
| 2019/0259284 A1* | 8/2019 | Khadloya | G06V 10/25 |
| 2019/0272433 A1* | 9/2019 | Yu | G06V 20/58 |
| 2019/0370574 A1* | 12/2019 | Wang | G06F 18/24143 |
| 2020/0026960 A1* | 1/2020 | Park | G06V 10/764 |

FOREIGN PATENT DOCUMENTS

| | | | | |
|---|---|---|---|---|
| CN | 109145747 A | 1/2019 | | |
| CN | 110782481 A | 2/2020 | | |
| EP | 2916262 A1 * | 9/2015 | | G06F 21/32 |
| WO | WO-2018016837 A1 * | 1/2018 | | G06K 9/00 |

OTHER PUBLICATIONS

International Search Report, PCT/CN2020/120860, dated Jan. 12, 2021, 3 Pages.
Peng. Yan et al.. Sea Surface Object Tracking for USV with Spatio-Temporal Context Fusion. Scientia Sinica Technologica. vol. 48, No. 12, Dec. 31, 2018 (Dec. 31, 2018), ISSN: 1674-7259.
Written Opinion (Non English), PCT/CN2020/120860, dated Jan. 12, 2021, 4 Pages.

* cited by examiner

INTELLIGENT DECISION-MAKING METHOD AND SYSTEM FOR UNMANNED SURFACE VEHICLE

CROSS REFERENCE TO RELATED APPLICATION

This patent application claims the priority of Chinese Patent Application No. 201910993637.8 titled "INTELLIGENT DECISION-MAKING METHOD AND SYSTEM FOR UNMANNED SURFACE VEHICLE" filed with the Chinese State Intellectual Property Office on Oct. 18, 2019, the disclosure of which is incorporated by reference herein in its entirety.

TECHNICAL FIELD

The present disclosure relates to the technical field of pattern recognition, in particular to an intelligent decision-making method and an intelligent decision-making system that utilize environmental information output by an external environmental perception device to achieve target classification and recognition.

BACKGROUND ART

The existing decision-making methods for unmanned surface vehicles respectively establish rules for target classification, recognition, and obstacle avoidance based on environmental information such as visible light images, infrared images, target navigation trajectories and positions of unmanned surface vehicles, and then make decisions such as avoidance, advancement, command and control according to these rules. To a certain extent, these decision-making methods realize the functions of relatively primary intelligent classification and decision, but they also have disadvantages such as computing dispersion, long time-computing for target recognition and classification, and few types of decisions.

Taking the rule of the target recognition of the visible light images as an example, the establishment of the rule of the target recognition of the visible light images requires a visible light image data and a deep learning network. The traditional deep learning network adopts a full-connection neural network to train and learn network parameters. When training target data or multi-target data that needs a large number of nodes, the full-connection neural network requires a large amount of computation and long training time. For example, for image data of M×N, the calculation of the required weights M×N×P in the training process is mainly reflected in the P nodes from the middle layer to the output layer, and ten thousands of network trainings consume a lot of time and computing resources.

SUMMARY

On this basis, the technical problem to be solved by the present disclosure is to provide an intelligent decision-making method and system for an unmanned surface vehicle in view of the defects in the prior art.

In order to achieve the above effect, the disclosure provides an intelligent decision-making system for an unmanned surface vehicle, which comprises:
an image acquisition module, configured to acquire an image sequence signal of an observation region;
a target detection and recognition module, configured to receive the image sequence signal, recognize a preset interested target appeared in a scenario, determine and identify an image region occupied by the preset interested target; distinguish a type of the interested target by a convolutional neural network model simultaneously, screen out the target that causes a threat to an unmanned platform itself according to the type of the target, continuously observe the target, and generate tracking trajectory information of the target;
a target situation distinguishing module, configured to calculate a target threat factor according to the tracking trajectory information, an optical axis angle, the type, and an attribute of the target, wherein the target threat factor comprises an angle threat factor, a speed threat factor, a height threat factor, a distance threat factor and a target type factor; and
a target threat evaluation and decision module, configured to evaluate a threat type according to the number of the threat factors and values of the threat factors, give a threat level, and lock the interested target with a high threat level for tracking in real time.

Optionally, when determining the image region occupied by the preset interested target, the image region is identified by a rectangular frame, and a central position of the rectangular frame is taken as an image coordinate of the target.

Optionally, the image sequence signal comprises a sequence signal of a visible light image and a sequence signal of an infrared image.

Optionally, the convolutional neural network model is specifically generated by the following steps:
using environmental information including a visible light image, an infrared image, a target navigation trajectory, and a position of the unmanned surface vehicle as an input of a convolutional layer;
obtaining a high-layer convolution feature map by continuously abstracting and combining input image features through a convolution template of the convolutional layer;
by a pooling layer, performing an aggregation statistic on the high-layer convolution feature map output by the convolutional layer to reduce a dimension of a feature vector, and outputting an aggregation value of an interested target feature map;
inputting the aggregation value of the interested target feature map output by the pooling layer into a fully connected layer of the convolutional neural network to output a target type eigenvalue; and
taking the target type eigenvalue output by the fully connected layer as an input value of a back propagation, and correcting the convolution template of the convolutional layer and a weight value of the fully connected layer by using a gradient descent algorithm to complete a training process for the convolution neural network once.

Optionally, a weight value of the high-layer convolutional feature map is updated for a second time, an infrared feature and an convolution template for the infrared feature are introduced into the convolutional layer, an infrared feature weight matrix is obtained by multiplying an infrared eigenvalue and the convolution template for the infrared feature, a new convolutional feature map is obtained by multiplying the infrared feature weight matrix and an element corresponding to the convolutional feature map obtained by a convolution template for a feature extraction of an image pixel matrix, an image feature map is obtained by adding the new convolutional feature map and a feature map obtained with convolution by a convolution template for a feature extraction of another image pixel matrix.

The present disclosure further provides an intelligent decision-making method for an unmanned surface vehicle, which comprises the following steps:

acquiring an image sequence signal of an observation region;

recognizing a preset interested target appeared in a scenario based on the image sequence signal, determining and identifying an image region occupied by the preset interested target, distinguishing a type of the interested target by a convolutional neural network model simultaneously, screening out the target that causes a threat to an unmanned platform itself according to the type of the target, continuously observing the target, and generating tracking trajectory information of the target;

calculating a target threat factor according to the tracking trajectory information, an optical axis angle, the type, and an attribute of the target, wherein the target threat factor comprises an angle threat factor, a speed threat factor, a height threat factor, a distance threat factor and a target type factor; and evaluating a threat type according to the number of the threat factors and values of the threat factors, giving a threat level, and locking the interested target with a high threat level for tracking in real time.

Optionally, when determining the image region occupied by the preset interested target, the image region is identified by a rectangular frame, and a central position of the rectangular frame is taken as an image coordinate of the target.

Optionally, the image sequence signal comprises a sequence signal of a visible light image and a sequence signal of an infrared image.

Optionally, the convolutional neural network model is specifically generated by the following steps:

using environmental information including a visible light image, an infrared image, a target navigation trajectory, and a position of the unmanned surface vehicle as an input of a convolutional layer;

obtaining a high-layer convolution feature map by continuously abstracting and combining input image features through a convolution template of the convolutional layer;

by a pooling layer, performing an aggregation statistic on the high-layer convolution feature map output by the convolutional layer to reduce a dimension of a feature vector, and outputting an aggregation value of an interested target feature map;

inputting the aggregation value of the interested target feature map output by the pooling layer into a fully connected layer of the convolutional neural network to output a target type eigenvalue; and taking the target type eigenvalue output by the fully connected layer as an input value of a back propagation, and correcting the convolution template of the convolutional layer and a weight value of the fully connected layer by using a gradient descent algorithm to complete a training process for the convolution neural network once.

Optionally, the method further comprises the following steps: updating a weight value of the high-layer convolutional feature map for a second time, introducing an infrared feature and an convolution template for the infrared feature into the convolutional layer, obtaining an infrared feature weight matrix by multiplying an infrared eigenvalue and the convolution template for the infrared feature, obtaining a new convolutional feature map by multiplying the infrared feature weight matrix and an element corresponding to the convolutional feature map obtained by a convolution template for a feature extraction of an image pixel matrix, obtaining an image feature map by adding the new convolutional feature map and a feature map obtained with convolution by a convolution template for a feature extraction of another image pixel matrix.

According to the detailed embodiments of the disclosure, the disclosure can achieve following technical effects:

The convolutional neural network used in the present disclosure can reduce the amount of calculation, however, the training time of the target classification and the parameter recognition is long, which causes problems such as slow training speed when the target classification and the parameter recognition are slightly adjusted in a dynamic usage scenario. In contrast, the use of external target features in the image sequence signal of the observation region, such as distance, speed and trajectory, to assist an adjustment of the weight value of the convolution template of the convolutional layer of the convolutional neural network can accelerate a rate of convergence of the weight value of the neural network, so as to realize a rapid adjustment of the target classification and the parameter recognition in a dynamic environment.

Furthermore, the present disclosure adopts a high-performance FPGA SOC heterogeneous multi-core high-speed signal processor to perform parallel processing on a position, attitude, and speed of a carrier, and a distance, orientation and optical electrical characteristics of the target output by an external environmental perception device, and determines a threat evaluation and ordering rule, an obstacle avoidance rule, a navigation path adjustment rule, a target classification and recognition rule, etc. according to the target classification and parameter recognition obtained by training. The decision-making device makes an intelligent choice based on these rules to improve the speed and accuracy of the intelligent decision.

BRIEF DESCRIPTION OF THE DRAWINGS

In order to more clearly illustrate the embodiments of the present disclosure or technical solutions in the related art, the accompanying drawings used in the embodiments will now be described briefly. It is obvious that the drawings in the following description are only some embodiments of the disclosure, and that those skilled in the art can obtain other drawings from these drawings without any inventive effort.

DETAILED DESCRIPTION OF THE EMBODIMENTS

Figure 1:
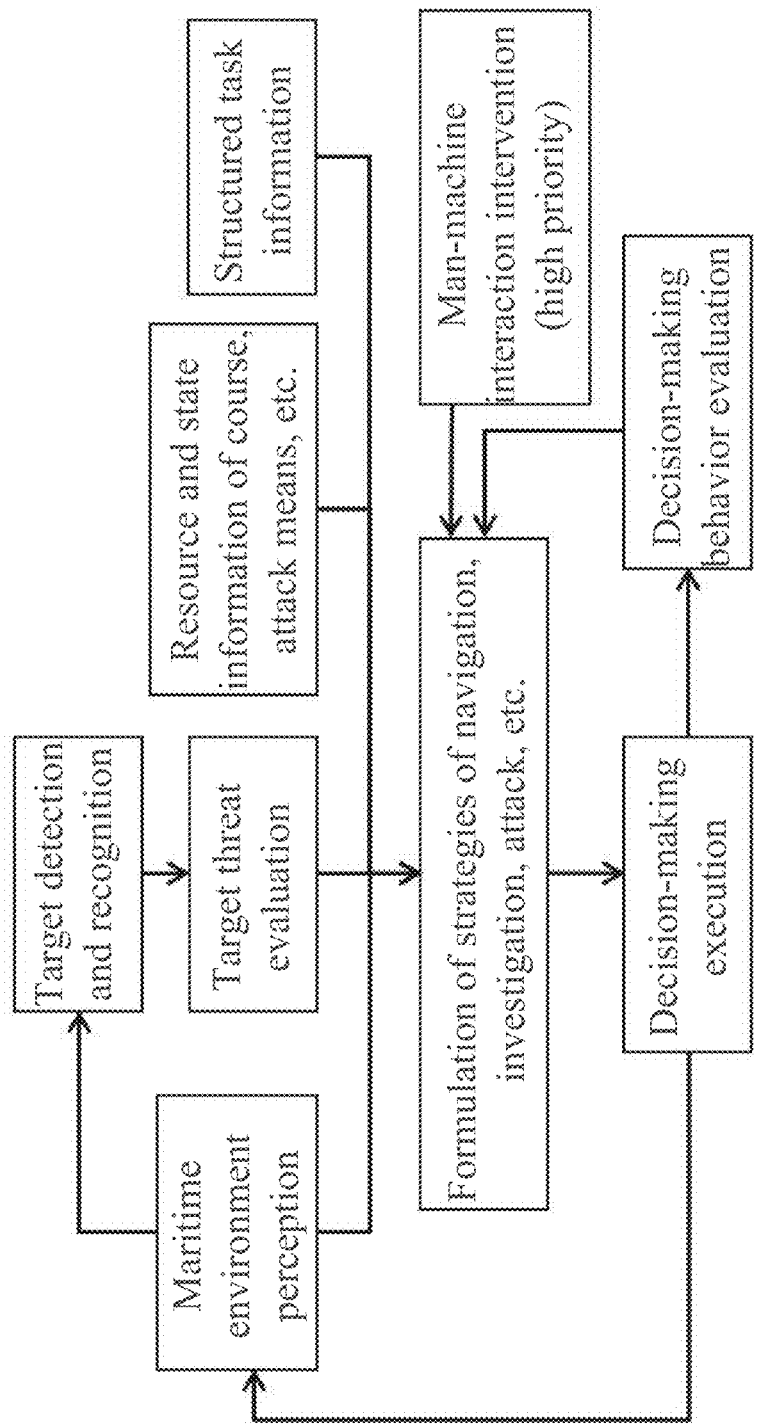
FIG. 1 is a schematic diagram of a relationship among a threat evaluation, an action decision, a decision feedback and a human-computer interaction.

In the following, the technical solutions in the embodiments of the present disclosure will be clearly and completely described with reference to the drawings in the embodiments of the present disclosure. Obviously, the described embodiments are only a part of the embodiments of the present disclosure, but not all the embodiments thereof. Based on the embodiments of the present disclosure, all other embodiments obtained by those skilled in the art without any creative efforts shall fall within the scope of the present disclosure.

For a better understanding of above intention, features and advantages of the present disclosure, the disclosure will be described in details by reference to the accompanying drawings and specific embodiments thereof.

The present disclosure utilizes a deep learning network to train data output by an environmental perception device, which is beneficial to determine a threat evaluation and ordering rule, an obstacle avoidance rule, a navigation path adjustment rule, a target classification and recognition rule, a restriction of laws and rules and the like, and then makes an intelligent decision based on the rules. In this method, the deep learning network is trained based on the information output by the environmental perception device to determine the threat evaluation and ordering rule, the obstacle avoidance rule, the navigation path adjustment rule, the target classification and recognition rule, the restriction of laws and rules and the like, and then makes the intelligent decision based on the rules.

Node weights of a deep model are obtained by training a large number of data samples in a form of end-to-end. Due to a special form of a convolutional neural network and a deep learning network, a training effect of the convolutional neural network on the data samples is mainly determined by the node weights, and the decision made by an intelligent decision-making system is determined by the deep learning network. The node weights are updated according to the trained data, which reduces an anti-interference capability of updating the node weights.

In order to reduce an amount of the trained data, the convolutional neural network is adopted to train image data. The convolutional neural network performs convolution and pooling operations on an input image pixel matrix, and extracts an overall feature matrix of the entire image by superimposing regional features. Compared with an original image pixel matrix, the number of input nodes of the neural network is greatly reduced.

The present disclosure provides an intelligent decision-making system for an unmanned surface vehicle, which comprises:
an image acquisition module, configured to acquire an image sequence signal of an observation region; wherein the image sequence signal may comprises a sequence signal of a visible light image and a sequence signal of an infrared image;
a target detection and recognition module, configured to receive the image sequence signal, recognize a preset interested target appeared in a scenario, determine and identify an image region occupied by the preset interested target; distinguish a type of the interested target by a convolutional neural network model simultaneously; screen out the target that may cause a threat to an unmanned platform itself according to the type of the target, continuously observe the target, and generate tracking trajectory information of the target; wherein when determining the image region occupied by the preset interested target, the image region is identified by a rectangular frame, and a central position of the rectangular frame is taken as an image coordinate of the target;
a target situation distinguishing module, configured to calculate a target threat factor according to the tracking trajectory information, an optical axis angle, the type, and an attribute of the target, wherein the target threat factor comprises an angle threat factor, a speed threat factor, a height threat factor, a distance threat factor and a target type factor; and
a target threat evaluation and decision module, configured to evaluate a threat type according to the number of the threat factors and values of the threat factors, give a threat level, and lock the interested target with a high threat level for tracking in real time.

Further, the convolutional neural network model is specifically generated by the following steps:
using environmental information including a visible light image, an infrared image, a target navigation trajectory, and a position of the unmanned surface vehicle as an input of a convolutional layer;
obtaining a high-layer convolution feature map by continuously abstracting and combining input image features through a convolution template of the convolutional layer;
by a pooling layer, performing an aggregation statistic on the high-layer convolution feature map output by the convolutional layer to reduce a dimension of a feature vector, and outputting an aggregation value of an interested target feature map;
inputting the aggregation value of the interested target feature map output by the pooling layer into a fully connected layer of the convolutional neural network to output a target type eigenvalue; and
taking the target type eigenvalue output by the fully-connected layer as an input value of a back propagation, and correcting the convolution template of the convolutional layer and a weight value of the fully connected layer by using a gradient descent algorithm to complete a training process for the convolution neural network once.

Further, a weight value of the high-layer convolutional feature map may be updated for a second time, an infrared feature and an convolution template for the infrared feature are introduced into the convolutional layer, an infrared feature weight matrix is obtained by multiplying an infrared eigenvalue and the convolution template for the infrared feature, a new convolutional feature map is obtained by multiplying the infrared feature weight matrix and an element corresponding to the convolutional feature map obtained by a convolution template for a feature extraction of an image pixel matrix, an image feature map is obtained by adding the new convolutional feature map and a feature map obtained with convolution by a convolution template for a feature extraction of another image pixel matrix.

The intelligent decision-making system for the unmanned surface vehicle of the embodiment of the present disclosure mainly includes four functions of a threat evaluation, an action decision, a decision feedback, and a human-computer interaction. FIG. 1 is a schematic diagram of a relationship among the threat evaluation, the action decision, the decision feedback and the human-computer interaction.

The specific technical solutions for these four functions are described below.

(1) threat evaluation

With respect to uncertainty and non-linear problems of battlefield environments, targets and tasks, the convolutional neural network learning is introduced to obtain classification and recognition of uncertain targets. Threat factors and target factors are determined by the threat evaluation after obtaining the classification and recognition of the targets, and then intelligent decisions are made according to decision rules.

The convolutional neural network adopted basically includes: the convolutional layer, the pooling layer, and an activation function. The involved adjustment of the weight value of the convolution feature map occurs on the extraction of the target feature of the convolutional layer.

① convolutional layer

The convolutional layer is the most basic and key component of the convolutional neural network and configured to continuously abstract and combine the image features to obtain high-layer features. Each layer of the convolutional layers is connected to a previous layer thereof through a convolution kernel. Each convolution kernel performs a convolution operation on a part of a feature map of the previous layer, and meanwhile the convolution kernel represents a weight of a neuron. The definition of the convolutional layer is as follows:

$$x_j^l = f\left(\sum_{i=1}^{M} x^{l-1} * k_{ij}^l + b_j^l\right)$$

wherein, $x_i^{l-1}$ represents the $i^{th}$ feature map of the $(l-1)^{-th}$ convolutional layer. $X_j^l$ represents the $j^{-th}$ feature map of the $l^{-th}$ convolutional layer. M represents the number of the feature maps of the current convolutional layer. $k_{ij}^l$ and $b_j^l$ respectively represent a weight parameter and a deviation that can be trained in the convolutional layer. $f(\cdot)$ represents a non-linear function, and the sign * represents a convolution operation. As the formula shows, the input of each convolutional layer is the output of the previous layer, i.e., the input of the convolutional layer comes from the previous layer. The input of the first convolutional layer comes from an input layer, i.e., the image.

A feature map with a size of m×n is passed through a filter with a convolution kernel size of w×w and a stride of d to obtain an output feature map with a size of $$\frac{m-w+d}{d} \cdot \frac{n-w+d}{d}.$$

Figure 2:
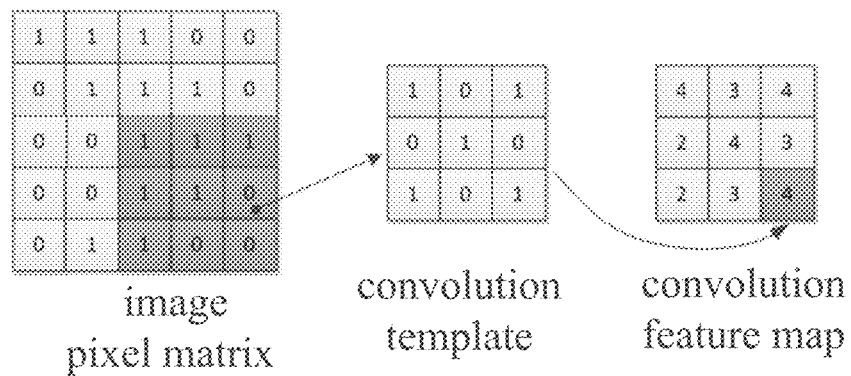
FIG. 2 is a schematic diagram of a convolution of a convolution kernel of a convolutional neural network.

Wherein, the number of the feature maps is determined by the number of the convolution kernels. FIG. 2 is a schematic diagram of the convolution operation.

② pooling layer

The pooling layer is a down-sampling layer. And the pooling layer is configured to perform the aggregation statistic on the feature maps output from the convolutional layer to reduce a dimension of a feature vector and avoid curse of dimension. In general, the pooling layer follows the convolutional layer. By performing a pooling operation on upper-layer features, the dimension of the features can be effectively reduced, the network parameters can be reduced, and the problem of over-fitting of the network can be improved. Meanwhile, pooling can also maintain a certain non-deformation (for a rotation, a translation, an expansion, etc.).

③ activation function

The activation function is a very important part in a framework of the convolutional neural network, called as a core of the convolutional neural network, and different from an original perceptron. The activation function is an activation model for simulating operations after receiving the signal by a brain neuron, which is defined as follows:

$$f_{Relu}(x) = \max(0, x) = \begin{cases} 0, x < 0 \\ x, x \geq 0 \end{cases}$$

The convolutional neural network updates the network parameters through the back propagation, and generally adopts the gradient descent algorithm to complete updates of the parameters with the following formula:

$$\nabla k_{ij} = -\alpha \frac{\partial E}{\partial k_{ij}} = \begin{cases} -\alpha o_i(0_j - t_j)o_j(1 - o_j) \\ -\alpha o_i\left(\sum_{l \in L} \delta_l k_{jl}\right) o_j(1 - o_j) \end{cases}$$

wherein, α is a learning rate, o is the output of a certain layer, k is the weight value, E is an error between a total output and an expected output, δ is an error of an output layer, and L is a derivative of network.

④ adjustment of the weight value of the convolution feature map

Figure 3:
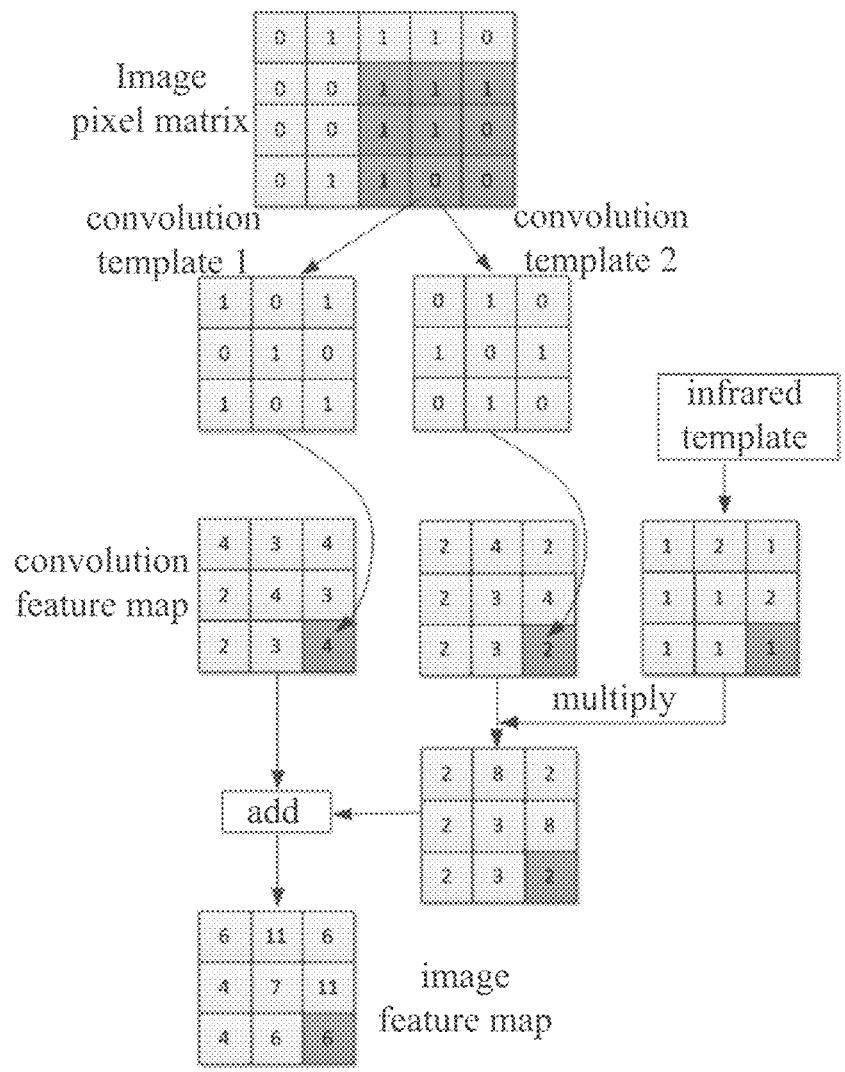
FIG. 3 is a schematic diagram of a multi-dimensional feature extraction of an image target.

In the convolutional neural network, a convolutional feature extraction is performed by means of an intervention using external assistant features, such as infrared features. FIG. 3 is a schematic diagram of a multi-dimensional feature extraction of an image target, with taking a 2-dimensional feature extraction as an example. Elements in the image pixel matrix are simply represented by 0 and 1. As shown in FIG. 3, 9 elements marked with dark color in the lower right corner of the pixel matrix are respectively subjected to convolution operations by convolution template 1 and convolution template 2 to obtain convolution feature elements. The convolution feature element is located in the dark area in the lower right corner of the convolution feature map. Different convolution feature elements can be obtained by sliding on the pixel matrix to compose the convolution feature map. Each convolution feature map represents a feature extracted from the pixel matrix. As shown in FIG. 3, a final composite feature map is obtained by adding two feature maps, which is called the image feature map.

The method of directly adding two feature maps to obtain the image feature map ignores the differences between the convolutional feature maps, and the different feature maps have different effects on training results. In order to enhance the target feature that is difficult to be processed and learned on the unmanned surface vehicle, the infrared feature and the convolution template for the infrared feature are introduced. Taking the infrared feature as 1 as an example. The infrared eigenvalue 1 is multiplied by an infrared template to obtain the infrared feature weight matrix. The infrared feature weight matrix is multiplied by the element corresponding to the convolutional feature map obtained by the convolution template 2 to obtain the new convolutional feature map. The new convolutional feature map and the feature map obtained with convolution by the convolution template 1 are added to obtain the image feature map. This process is beneficial for adjusting training parameters of the convolutional neural network in real time on the sea to realize adaptive adjustments to the relatively difficult training scene.

In the convolutional neural network in the training process of ①, ②, ③, and ④, the environmental information, such as a visible light image, an infrared image, a target navigation trajectory, and a position of the unmanned surface vehicle, is taken as an input, and the type and the feature of the target are taken as output. According to the type and the feature of the target, threat evaluation rules are established, and the threat factors are determined based on the target's information, such as relative angle, speed, distance, and height, to make the action decision.

(2) action decision

On the basis of the data, the determined rules are applied to make the decision with the best total benefit. An intelligent system with autonomous decision function applies the rules to convert various input decision information into strategy scores, and a strategy with the highest score is an optimal decision. The various rules are formulated comprehensively, accurately and coordinately. For example, the targets with different threats are marked as tracking or non-tracking states. Meanwhile, the target with a great threat is locked by utilizing multiple resources of the unmanned surface vehicle for a real-time tracking.

(3) decision feedback

An execution of the decision has a function of a real-time feedback. Various resources and equipment, such as, the speed and a course of the unmanned surface vehicle, and a pitch and a focal length of a detection system, are coordinated during the target tracking. The target is recognized and tracked according to the decision information and the recognized and tracked information of the target is fed back to a main control board. The main control board controls tracking controls of a tracking television and a tracking infrared according to the feedback of the distance, orientation, speed, angle, etc. of the target.

(4) human-computer interaction

A current state is evaluated and reported, and a request for a manual intervention is issued as necessary.

In the present disclosure, a method for extracting features in a convolutional neural network with an external feature assistance is proposed. The method updates the weight value of the convolutional feature map for a second time to enhance an extraction weight of the assistant features and further accelerate a training speed of the network parameters. Since unmanned surface vehicle platforms are facing complex maritime application environments, besides parameters and decision rules of various types of targets to be trained in advance, a recognition accuracy and a training speed of one type or even several types of target features are trained in a targeted manner according to a maritime real-time image to update the training parameters of the convolutional neural network in real time, so as to realize the intelligent decision.

(2) Realize lightweight and integration of the intelligent decision-making device.

The intelligent decision-making device takes the intelligent decision-making method as a core. The intelligent decision-making method utilizes a high-performance FPGA SOC heterogeneous multi-core high-speed signal processor to process image information and perform convolutional neural network calculations to reduce the number of processors. The intelligent decision-making device has standardized interfaces and been modularized such that it can be conveniently integrated with the environment perception device, which reduces the volume and the weight of the intelligent decision-making device and achieves an integration of decision-making and perception.

The intelligent decision-making device and the intelligent decision-making method of the present disclosure can be widely applied on the unmanned surface vehicle due to the above advantages.

The intelligent decision-making system of the present disclosure mainly includes a target detection and recognition module, a target situation distinguishing module and a target threat evaluation and decision module. The convolutional neural network is configured to extract the target feature in the target detection and recognition.

(1) target detection and recognition module

Figure 4:
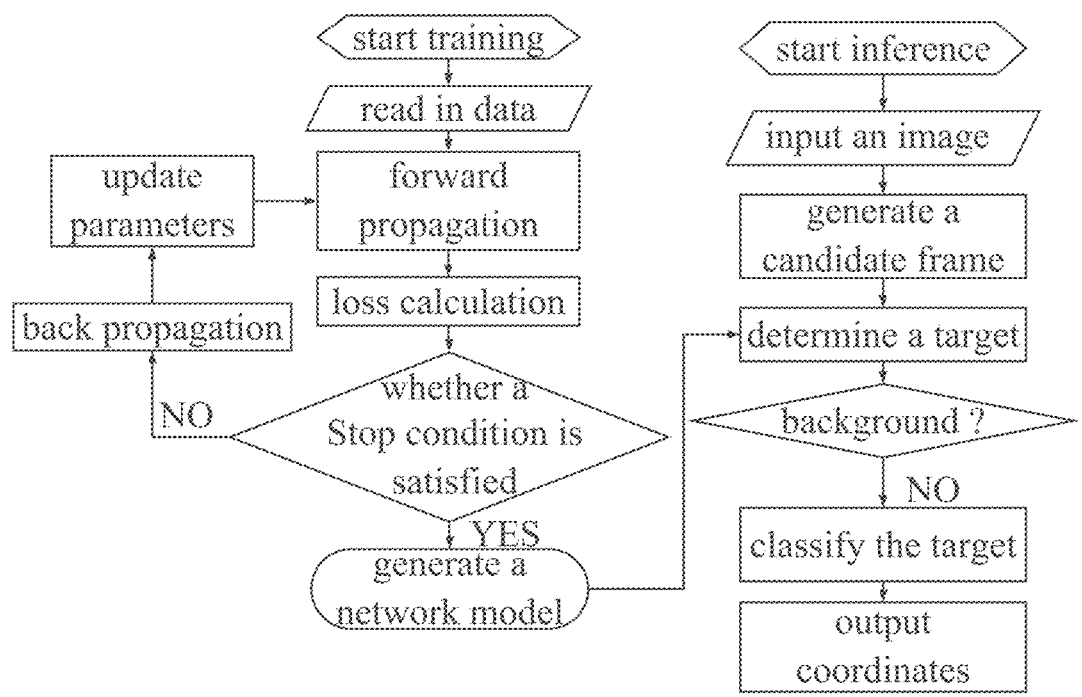
FIG. 4 is a flowchart of a target detection and recognition.

FIG. 4 is a flowchart of the target detection and recognition. As shown in FIG. 4, the target detection and recognition module receives the image sequence signal, recognizes and marks the interested target appeared in the scenario. Main functions of the target detection and recognition module include:

① detecting the target, wherein, it is detected whether there is an preset interested target in the current scenario;

② positioning the image coordinate of the target, wherein if the interested target exists in the current scenario, an image region occupied by the interested target is determined and identified by a rectangular frame, and the central position of the rectangular frame is taken as the image coordinate of the target;

③ recognizing the type of the target, wherein the type of the interested target is distinguished;

④ primary screening of threat targets, wherein the targets that may cause threats to the unmanned platform itself are screened out according to the type of the target, and a suggestion for continuously observing the targets is proposed.

Software parts of the above-mentioned target detection and recognition ①, ②, ③, ④ are mainly realized by the convolutional neural network.

The training process of a target recognition model and the determination process of the target recognition are shown in FIG. 4.

The training process of the target recognition model includes:

starting the training process of the convolutional neural network, reading data such as a target image, a target trajectory, and an infrared detection, and conducting a forward propagation through the convolution layer, the pooling layer, and the fully connected layer; determining whether the trained model parameter satisfies a stop condition according to a loss function, and under a condition that the trained model parameter satisfies the stop condition, using the network model parameter successfully trained as an input of the determination process of the target recognition; under a condition that the trained model parameter is not satisfied with the stop condition, continuing to conduct a back propagation, updating the convolution template for the convolutional layer and the weight parameter for the fully connected layer, and continuing to conduct the forward propagation, a loss calculation, the determination of the stop condition, and the back propagation cyclically.

The determination process of the target recognition includes:

starting a process of the target recognition, generating a target candidate frame according to the data of the input target image, determining whether the target exists and determining the type of the target by utilizing the model parameter output after training via the convolutional neural network, classifying the target under a condition that the target is a real target rather than a background target, outputting the type of the target and position coordinates of the target.

Figure 5:
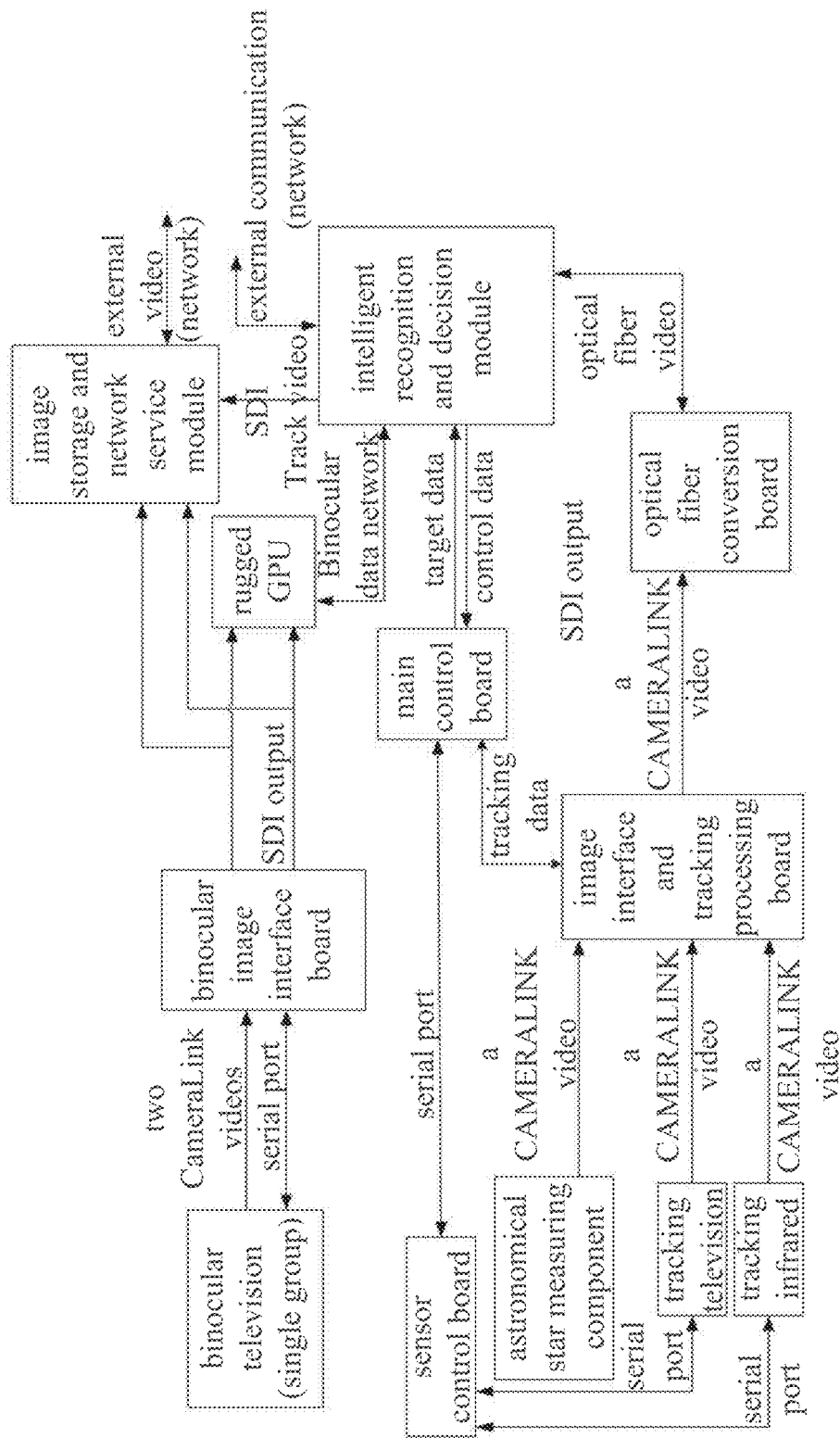
FIG. 5 is an overall block diagram of an image processing system.

An image processing system relates to components such as tracking, binocular and recognition, as shown in FIG. 5. An input sensor in the image processing system shown in FIG. 5 comprises a binocular television, an astronomical star measuring component, a tracking television and a tracking infrared system. The binocular television records video image data and sends the video image data to a binocular image interface board through CAMERALINK. The binocular image interface board outputs two signals, one of which outputs the video data to a network or other memory via an image storage and network service module, and the other of which outputs the video data to an intelligent recognition and decision module via a rugged GPU. The intelligent recognition and decision module sends control instructions for the tracking television and the tracking infrared to the main control board. The main control board sends tracking instructions to the tracking television and the tracking infrared via the serial port through a sensor control board. The tracking television and the tracking infrared track the target and output the video image to an image interface and tracking processing board. The image interface and tracking processing board processes the videos from the tracking infrared and the tracking television and outputs to an optical fiber conversion board. Finally, the optical fiber conversion board sends the video image to other systems. The astronomical star measuring component sends missing target data of the star measuring to the optical fiber conversion board via the image interface and tracking processing board and finally to other systems. The image interface and tracking processing board selects one of CameraLink video signals of the astronomical star measuring component, the tracking television and the tracking infrared, and outputs the CameraLink video signal. Meanwhile, the image interface and tracking processing board processes the CameraLink video signal of the tracking television or the tracking infrared according to a selection instruction for a tracked channel, extracts and tracks the target, and outputs the data, such as the target coordinates and features, through the serial port. Controls of a television and an infrared sensor are completed by the sensor control board.

The intelligent recognition and decision module is also responsible for communicating with an external system, outputting tracking, recognition, and decision data and information, and forwarding control information of the external systems to the present system.

The binocular image interface board is configured to collect a set of two binocular CameraLink images, convert an input video into an SDI video signal for output, and control a camera through two serial ports and a synchronous control interface. The rugged GPU module measures the distance and the image coordinate information of the target in a specified region through a series of processing such as image preprocessing and matching, and outputs through the serial port. The targets mainly include surface combatants, speedboats, buoys, etc.

(2) target situation distinguishing module

Figure 6:
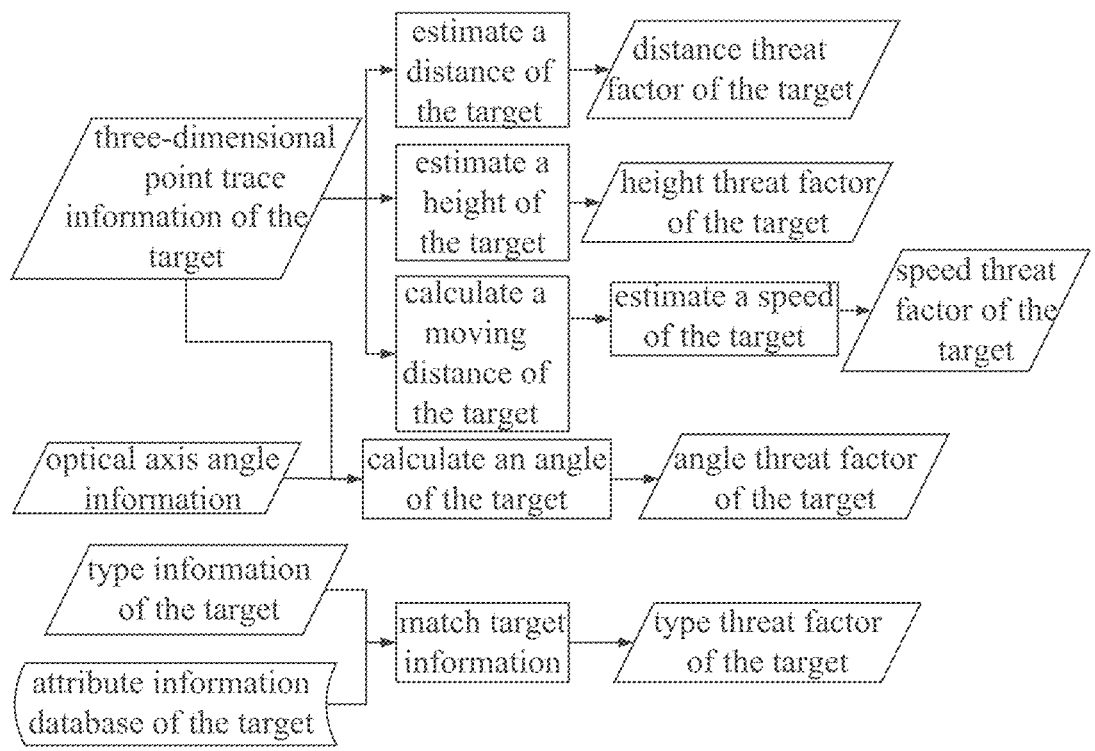
FIG. 6 is a flow chart of distinguishing a target situation.

FIG. 6 is a flow chart of distinguishing the target situation. The threat factors are calculated separately according to three-dimensional point trace information, video optical axis angle information, type information and attribute information database of the target. According to the three-dimensional point trace information of the target, the distance of the target is estimated to obtain a threat factor of the distance of the target, a height of the target is estimated to obtain a height threat factor of the target, and a speed and the distance of the target are estimated to obtain a speed threat factor of the target. According to the optical axis angle of the target and the three-dimensional point trace information of the target, an angle of the target is calculated to obtain an angle threat factor of the target. According to the type information and the attribute information database of the target, information matching is performed with respect to the target and the threat factor of the type of the target is calculated. The threat factors include threat factors on the type, relative angle, speed, distance, and height of the target, and details thereof are as follows:

① angle threat factor: for most aerial targets that adopt head-on attack tactics, the greater the entrance angle and the lead angle of the target, the greater the threat; and for sea-surface targets, when there is a tendency to move toward the platform itself, the possibility of the threat is greater.

② speed threat factor: for aerial targets, the greater the speed of the target aircraft, the greater the initial kinetic energy, and the farther the airborne missile is launched. This is a very important indicator in air combat beyond visual range. For sea-surface targets, the absolute speed advantage plays a more obvious role in escaping and pursuing.

③ height threat factor: mainly for aerial targets, when the aerial targets start to approach the unmanned platform at a low altitude, the threat to the platform becomes greater.

④ distance threat factor: the distance determines an attack mode. Different attack modes correspond to different attack strategies and different threats to unmanned platforms.

⑤ target type factor: different military target types correspond different military applications, and are equipped with different weapons. An attacking target may threat its security, a reconnaissance target may threat its intelligence security, obstacles and civilian ships may threat its navigation, and search and rescue targets themselves have security threats.

(3) target threat evaluation and decision module

Figure 7:
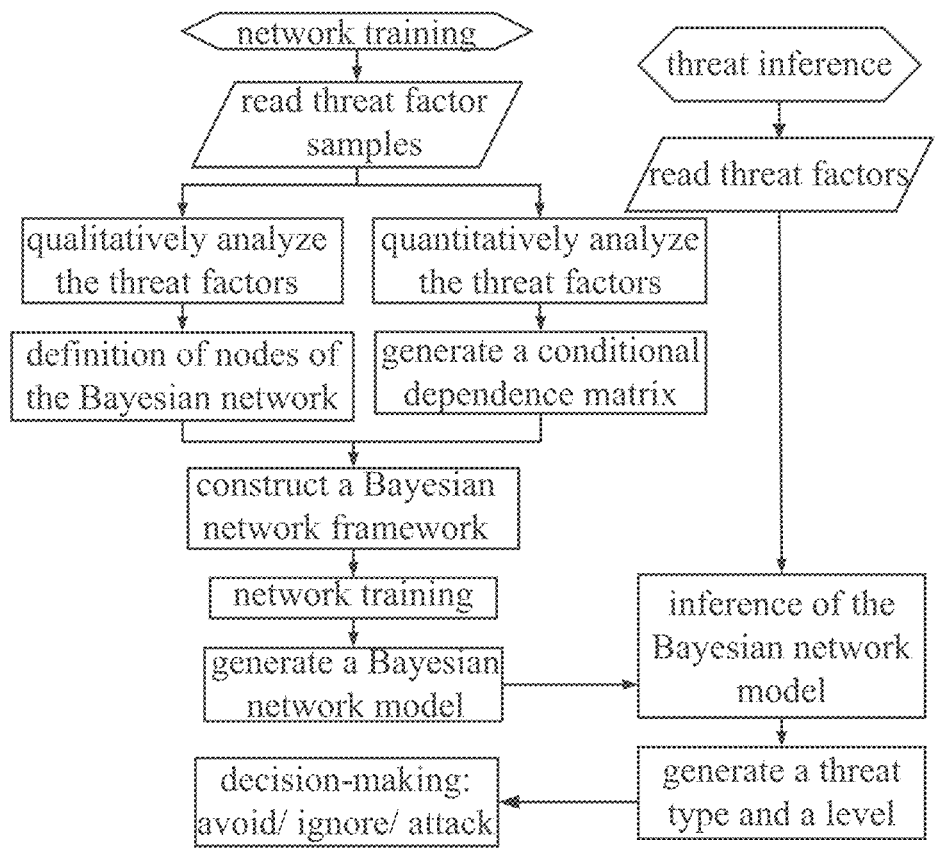
FIG. 7 is a flowchart of a target threat evaluation and decision.

FIG. 7 is a flowchart of the target threat evaluation and decision. As shown in FIG. 7, the threat evaluation and decision generates a Bayesian network model through a process of network training. The Bayesian network model is configured to assist an inference of the Bayesian network model to obtain the threat evaluation and the threat level, and finally make the decision based on a result of the threat evaluation. In the process of network training, a series of threat factor samples such as a threat factor of a sea-surface speedboat with high speed need to be collected first. A sample set of the threat factors is qualitatively analyzed to generate a definition of nodes of the Bayesian network, and quantitatively analyzed to generate a conditional dependence matrix. A Bayesian network framework is constructed according to the definition of the nodes of the Bayesian network and the conditional dependence matrix, and the Bayesian network is trained to generate the Bayesian network model. In a process of threat inference, a real-time threat factor is generated by processing the data input by the sensor in real time. The type and level of the threat factor are determined according to the Bayesian network model generated by a training network. The threat type may be evaluated according to the number and the value of the threat factors, the threat level may be given, and finally the decision is made.

The threat types mainly are as follows:

① Navigation threat. Such threat generally refers to a state of a non-high-speed movement approaching the platform itself, and collisions may occur if the speed and course of the unmanned surface vehicle itself are maintained. In this case, an evasion signal needs to be sent to notify a control system of the unmanned platform to change the course and speed to avoid the collisions and plan a safe path at the same time.

② Security threat. Such threat has a high firepower, or approaches the unmanned platform at a high speed in order to damage the unmanned platform. In this case, the unmanned platform may choose to attack, change the course or accelerate away according to the threat level.

③ Intelligence threat. Such threat has a faster maneuverability and a better reconnaissance equipment, and is not a threat to the security of the unmanned platform itself. However, the enemy aims to obtain our intelligence, such that we are in danger of leaking military information. In this case, the unmanned platform may choose to attack or accelerate away according to the threat level.

④ Security threat of a cooperative target. When performing tasks such as search and rescue, and escort, the cooperative target may be attacked by a hostile target or fall into an environmental distress. In this case, the unmanned platform may choose to accelerate or call for support according to the threat level.

Figure 8:
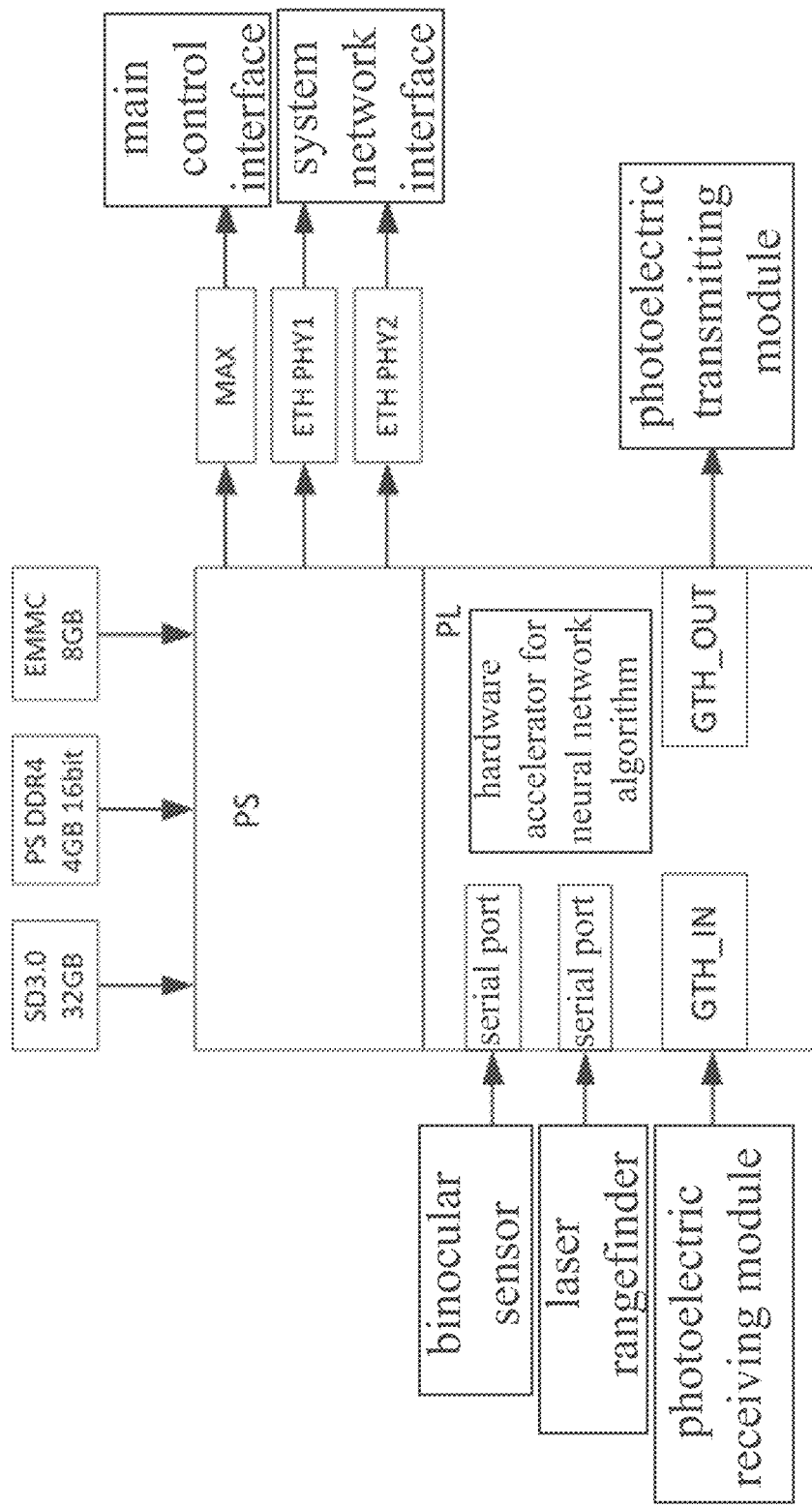
FIG. 8 is a schematic diagram of an intelligent decision-making system.

FIG. 8 is a schematic diagram of the intelligent decision-making system. Intelligent decision-making hardwares include a hardware accelerator for a neural network algorithm, the FPGA SOC heterogeneous multi-core high-speed signal processor, a binocular sensor, a laser rangefinder, a photoelectric receiving module, a photoelectric transmitting module, a network interface and a storage module such as SD3.0/DDR4. The hardwares further include an SOC processing chip, a high-speed memory and a large-capacity data chip. The main functions such as intelligent image processing and intelligent decision-making are completed through the built-in hardware accelerator for the neural network algorithm.

The main performance indicators implemented by the intelligent decision-making system are as follows:
a time for identifying the target: not greater than 0.25 s;
an accuracy rate for distinguishing the target: not less than 90%;
an accuracy rate for distinguishing the target type: not less than 80%;
working voltage: 12V;
power consumption: not greater than 30 W;
physical size: 228.5 mm×152 mm;
communication: Gigabit Ethernet and serial port;
data: 10 Gigabit multimode optical fiber;
video capture: optical fiber; and
video output: HDMI and SDI.

Figure 9:
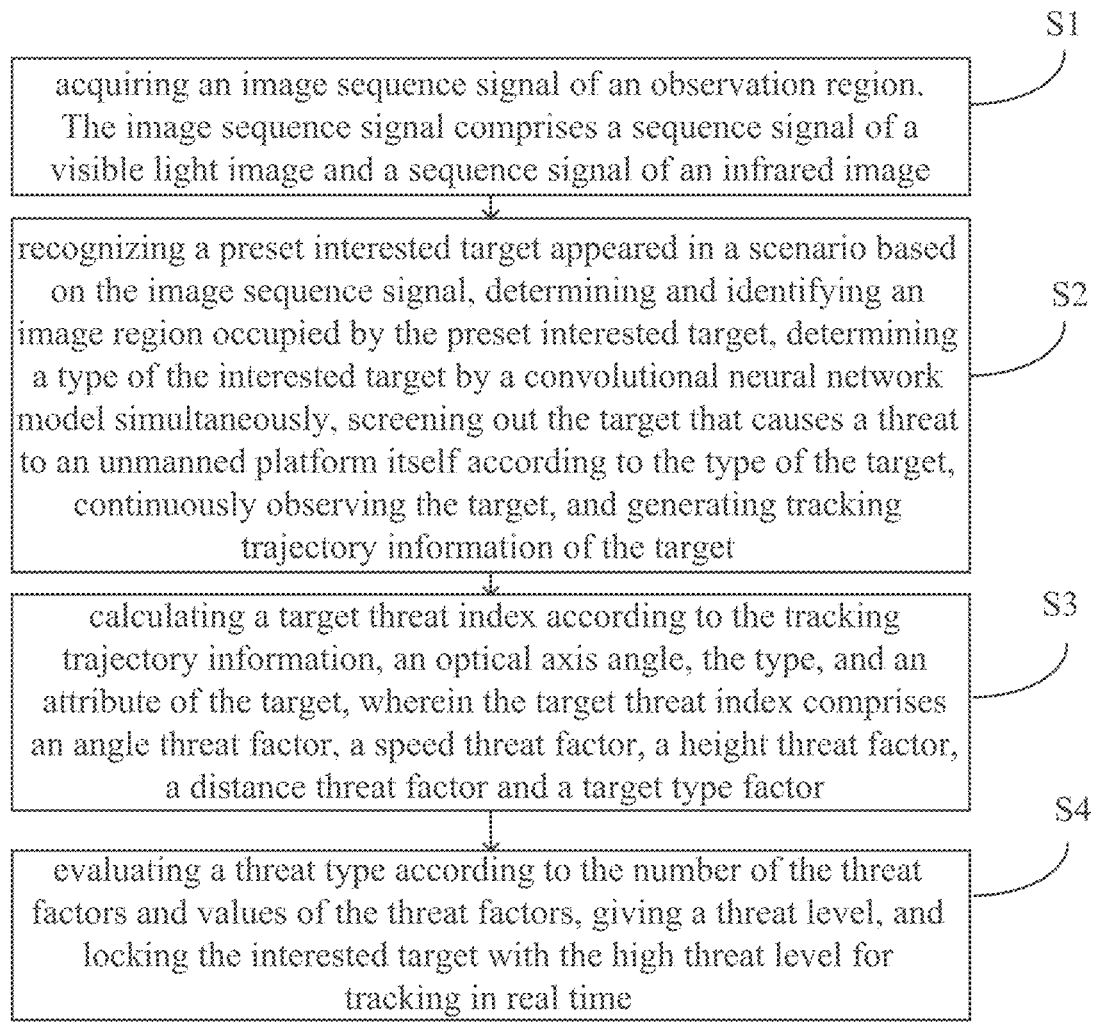
FIG. 9 is a flow chart of an intelligent decision-making method for an unmanned surface vehicle.

As shown in FIG. 9, the present disclosure further provides an intelligent decision-making method for an unmanned surface vehicle, which includes steps S1-S4:

S1: an image sequence signal of an observation region is acquired; wherein, the image sequence signal comprises a sequence signal of a visible light image and a sequence signal of an infrared image.

S2: a preset interested target appeared in a scenario is recognized based on the image sequence signal, an image region occupied by the preset interested target is determined and identified, a type of the interested target is distinguished by a convolutional neural network model simultaneously, the target that causes a threat to an unmanned platform itself is screened out according to the type of the target, the target is observed continuously, and tracking trajectory information of the target is generated.

Wherein, when determining the image region occupied by the preset interested target, the image region is identified by a rectangular frame, and a central position of the rectangular frame is taken as an image coordinate of the target.

The convolutional neural network model is specifically generated by the following steps:
using environmental information including a visible light image, an infrared image, a target navigation trajectory, and a position of the unmanned surface vehicle as an input of a convolutional layer;
obtaining a high-layer convolution feature map by continuously abstracting and combining input image features through a convolution template of the convolutional layer;
by a pooling layer, performing an aggregation statistic on the high-layer convolution feature map output by the convolutional layer to reduce a dimension of a feature vector, and outputting an aggregation value of an interested target feature map;
inputting the aggregation value of the interested target feature map output by the pooling layer into a fully connected layer of the convolutional neural network to output a target type eigenvalue; and
taking the target type eigenvalue output by the fully connected layer as an input value of a back propagation, and correcting the convolution template of the convolutional layer and a weight value of the fully connected layer by using a gradient descent algorithm to complete a training process for the convolution neural network once.

S3: a target threat factor is calculated according to the tracking trajectory information, an optical axis angle, the type, and an attribute of the target. Wherein the target threat factor includes an angle threat factor, a speed threat factor, a height threat factor, a distance threat factor and a target type factor.

S4: a threat type is evaluated according to the number of the threat factors and values of the threat factors, a threat level is given, and the interested target with the high threat level is locked for tracking in real time.

The above method further includes the following steps: updating a weight value of the high-layer convolutional feature map for a second time, introducing an infrared feature and a convolution template for the infrared feature into the convolutional layer, obtaining an infrared feature weight matrix by multiplying an infrared eigenvalue and the convolution template for the infrared feature, obtaining a new convolutional feature map by multiplying the infrared feature weight matrix and an element corresponding to the convolutional feature map obtained by a convolution template for a feature extraction of an image pixel matrix, obtaining an image feature map by adding the new convolutional feature map and a feature map obtained with convolution by a convolution template for a feature extraction of another image pixel matrix.

Various embodiments of the description have been described in a progressive way, each of which emphasizes the difference from the others, and among which the same and similar parts can be referred to each other.

The principles and implementation of the present disclosure have been described herein with specific examples, and the above embodiments are described only for a better understanding of the methods and core concepts of the present disclosure; meanwhile, the detailed implementation and the application scope could be amended by those skilled in the art according to the teachings of this disclosure. In conclusion, the contents of the description should not be construed as limiting the disclosure.

What is claimed is:

1. An intelligent decision-making system comprises a processor and a memory, the memory is configured to store a computer-executable instruction, and when the intelligent decision-making system runs, the processor executes the computer-executable instruction in the memory, to perform following operation steps:
   acquire an image sequence signal of an observation region;
   receive the image sequence signal, recognize a preset interested object appeared in a scenario, determine and identify an image region occupied by the preset interested object to be recognized at water surface, distinguish to which classification the interested object belongs by a convolutional neural network model simultaneously, screen out the interested object that causes a threat to an unmanned platform itself according to the classification of the interested object, continuously observe the interested object, and generate tracking trajectory information of the interested object;
   calculate an object threat factor according to the tracking trajectory information, an optical axis angle, the classification, and an attribute of the interested object, wherein the object threat factor comprises an angle threat factor, a speed threat factor, a height threat factor, a distance threat factor and an object classification factor; and
   evaluate a threat classification according to a number of the threat factors and values of the threat factors, give a threat level, and lock the interested object with a high threat level for tracking in real time.

2. The intelligent decision-making system for the unmanned surface vehicle according to claim 1, wherein when determining the image region occupied by the preset interested object, the image region is identified by a rectangular frame, and a central position of the rectangular frame is taken as an image coordinate of the interested object.

3. The intelligent decision-making system for the unmanned surface vehicle according to claim 1, wherein the image sequence signal comprises a sequence signal of a visible light image and a sequence signal of an infrared image.

4. The intelligent decision-making system for the unmanned surface vehicle according to claim 1, wherein the convolutional neural network model is specifically generated by the following steps:
   using environmental information including a visible light image, an infrared image, an object navigation trajectory, and a position of the unmanned surface vehicle as an input of a convolutional layer;
   obtaining a high-layer convolution feature map by continuously abstracting and combining input image features through a convolution template of the convolutional layer;
   by a pooling layer, performing an aggregation statistic on the high-layer convolution feature map output by the convolutional layer to reduce a dimension of a feature vector, and outputting an aggregation value of an object feature map;
   inputting the aggregation value of the object feature map output by the pooling layer into a fully connected layer of the convolutional neural network to output an object classification eigenvalue; and
   taking the object classification eigenvalue output by the fully connected layer as an input value of a back propagation, and correcting the convolution template of the convolutional layer and a weight value of the fully connected layer by using a gradient descent algorithm to complete a training process for the convolution neural network once.

5. The intelligent decision-making system for the unmanned surface vehicle according to claim 4, wherein a weight value of the high-layer convolutional feature map is updated for a second time, an infrared feature and a convolution template for the infrared feature are introduced into the convolutional layer, an infrared feature weight matrix is obtained by multiplying an infrared eigenvalue and the convolution template for the infrared feature, a new convolutional feature map is obtained by multiplying the infrared feature weight matrix and an element corresponding to the convolutional feature map obtained by a convolution template for a feature extraction of an image pixel matrix, an image feature map is obtained by adding the new convolutional feature map and a feature map obtained with convolution by a convolution template for a feature extraction of another image pixel matrix.

6. An intelligent decision-making method for an unmanned surface vehicle, comprising:
   acquiring an image sequence signal of an observation region;
   recognizing a preset interested object on water surface appeared in a scenario based on the image sequence signal, determining and identifying an image region occupied by the preset interested object, distinguishing a classification of the interested object by a convolutional neural network model simultaneously, screening out the interested object that causes a threat to an unmanned platform itself according to the classification of the interested object, continuously observing the interested object, and generating tracking trajectory information of the interested object;
   calculating an object threat factor according to the tracking trajectory information, an optical axis angle, the classification, and an attribute of the interested object, wherein the interested object threat factor comprises an angle threat factor, a speed threat factor, a height threat factor, a distance threat factor and an object classification factor; and
   evaluating a threat classification according to a number of the threat factors and values of the threat factors, giving a threat level, and locking the interested object with a high threat level for tracking in real time.

7. The intelligent decision-making method for the unmanned surface vehicle according to claim 6, wherein when determining the image region occupied by the preset interested object, the image region is identified by a rectangular frame, and a central position of the rectangular frame is taken as an image coordinate of the interested object.

8. The intelligent decision-making method for the unmanned surface vehicle according to claim 6, wherein the image sequence signal comprises a sequence signal of a visible light image and a sequence signal of an infrared image.

9. The intelligent decision-making method for the unmanned surface vehicle according to claim 6, wherein the convolutional neural network model is specifically generated by the following steps:
   using environmental information including a visible light image, an infrared image, an object navigation trajectory, and a position of the unmanned surface vehicle as an input of a convolutional layer;

obtaining a high-layer convolution feature map by continuously abstracting and combining input image features through a convolution template of the convolutional layer;

by a pooling layer, performing an aggregation statistic on the high-layer convolution feature map output by the convolutional layer to reduce a dimension of a feature vector, and outputting an aggregation value of an object feature map;

inputting the aggregation value of the object feature map output by the pooling layer into a fully connected layer of the convolutional neural network to output an object classification eigenvalue; and taking the object classification eigenvalue output by the fully connected layer as an input value of a back propagation, and correcting the convolution template of the convolutional layer and a weight value of the fully connected layer by using a gradient descent algorithm to complete a training process for the convolution neural network once.

10. The intelligent decision-making method for the unmanned surface vehicle according to claim 9, wherein the method further comprises the following steps:

updating a weight value of the high-layer convolutional feature map for a second time, introducing an infrared feature and a convolution template for the infrared feature into the convolutional layer, obtaining an infrared feature weight matrix by multiplying an infrared eigenvalue and the convolution template for the infrared feature, obtaining a new convolutional feature map by multiplying the infrared feature weight matrix and an element corresponding to the convolutional feature map obtained by a convolution template for a feature extraction of an image pixel matrix, obtaining an image feature map by adding the new convolutional feature map and a feature map obtained with convolution by a convolution template for a feature extraction of another image pixel matrix.

* * * * *